(12) United States Patent
Hopkins

(10) Patent No.: US 10,968,038 B2
(45) Date of Patent: Apr. 6, 2021

(54) COLLAPSIBLE TILT TRUCK

(71) Applicant: Troy Hopkins, Huntsville, AL (US)

(72) Inventor: Troy Hopkins, Huntsville, AL (US)

( * ) Notice: Subject to any disclaimer, the term of this patent is extended or adjusted under 35 U.S.C. 154(b) by 0 days.

(21) Appl. No.: 16/539,912

(22) Filed: Aug. 13, 2019

(65) Prior Publication Data

US 2019/0367269 A1     Dec. 5, 2019

Related U.S. Application Data

(60) Provisional application No. 62/841,268, filed on May 1, 2019.

(51) Int. Cl.
    *B65F 3/26*     (2006.01)
    *B65F 3/00*     (2006.01)
    *B62B 3/02*     (2006.01)

(52) U.S. Cl.
    CPC .............. *B65F 3/005* (2013.01); *B62B 3/025* (2013.01); *B65F 3/26* (2013.01); *B65F 2220/1063* (2013.01)

(58) Field of Classification Search
    CPC .... B65F 2220/1063; B65F 3/005; B65F 3/26; B65F 1/1473; B65F 3/00; B65B 3/025; B60F 3/00; B62B 3/02; B62B 3/08
    USPC ......................................................... 280/651
    See application file for complete search history.

(56) References Cited

U.S. PATENT DOCUMENTS 2,938,748 A * 5/1960 Johnson .................... B62B 1/12
                                                                  296/26.11
2,992,011 A * 7/1961 Becan ..................... A01G 20/30
                                                                  280/654
3,346,271 A * 10/1967 Parsons ..................... B62B 3/14
                                                                 280/33.998
3,367,676 A * 2/1968 Pearson .................. B62B 1/208
                                                                  280/654
3,514,123 A * 5/1970 Injeski ...................... B62B 1/12
                                                                  280/652
3,633,932 A * 1/1972 Holden ................... B62B 3/106
                                                                  280/641

(Continued)

FOREIGN PATENT DOCUMENTS

| FR | 2746379 A1 | * | 9/1997 | ................ B65F 1/02 |
|---|---|---|---|---|
| GB | 2180508 A | * | 4/1987 | ................ B62B 3/02 |
| WO | 2013/090213 A9 | | 6/2013 | |

*Primary Examiner* — James A Shriver, II
*Assistant Examiner* — Hilary L Johns
(74) *Attorney, Agent, or Firm* — F. Wayne Thompson, Jr.; Asgaard Patent Services, LLC

(57) ABSTRACT

Implementations of a collapsible tilt truck that can be used to collect, transport, and dump refuse are provided. The tilt truck is configured so that it can be collapsed (or folded) when not in use, thereby facilitating its storage in a compact space. The tilt truck comprises a collapsible frame and collection bin. The collection bin comprises a two-part bottom panel, a front panel, a back panel, and two lateral side panels, each of the panels is attached to the collapsible frame. The lateral side panels are configured to fold when the tilt truck is collapsed. In some implementation, the collapsible tilt truck includes a trash bag bracket that is positioned within the collection bin. In this way, a trash bag can be secured to the trash bag bracket and used to collect and transport loose trash and/or recyclables separately from the refuse generally stored in the collection bin.

16 Claims, 9 Drawing Sheets

(56) References Cited

U.S. PATENT DOCUMENTS

| | | | | |
|---|---|---|---|---|
| 3,690,692 | A * | 9/1972 | Florian | B62B 1/208 280/654 |
| 3,827,708 | A * | 8/1974 | Derry | B62B 3/02 280/651 |
| 3,858,929 | A * | 1/1975 | Brescia | B62B 3/08 280/47.12 |
| 4,222,585 | A * | 9/1980 | Crothers | B62B 1/147 280/47.26 |
| 4,343,487 | A * | 8/1982 | Crothers | B62B 1/147 280/47.26 |
| 4,478,428 | A * | 10/1984 | Ziliani | A47B 31/04 108/177 |
| 4,511,154 | A * | 4/1985 | Daloisio | B62B 3/12 280/47.26 |
| 4,765,646 | A * | 8/1988 | Cheng | B62B 3/022 280/651 |
| 4,789,171 | A * | 12/1988 | Porter | B62B 1/20 280/47.18 |
| 4,861,110 | A * | 8/1989 | Rumpke | B62B 3/08 298/2 |
| 4,953,744 | A * | 9/1990 | Koyama | B65F 1/06 220/495.11 |
| 5,988,671 | A * | 11/1999 | Abelbeck | B62B 1/12 280/649 |
| 6,139,029 | A * | 10/2000 | Shaw | B62B 1/206 280/47.371 |
| 6,354,619 | B1 * | 3/2002 | Kim | B62B 3/106 280/649 |
| 6,598,898 | B2 * | 7/2003 | Chu | B62B 1/12 280/47.131 |
| 6,637,764 | B2 * | 10/2003 | Novakowski | B65F 3/005 224/404 |
| 8,851,504 | B1 * | 10/2014 | Goldszer | B62B 3/02 280/651 |
| D767,232 | S | 9/2016 | Blitzer et al. | |
| 9,604,779 | B2 | 3/2017 | Ristagno | |
| 10,099,712 | B1 * | 10/2018 | Sun | B62B 3/025 |
| 2004/0041361 | A1 * | 3/2004 | Lim | B62B 1/20 280/47.31 |
| 2005/0103950 | A1 * | 5/2005 | Joubert | B65F 1/1468 248/98 |
| 2005/0275195 | A1 * | 12/2005 | Matula | B62B 5/0438 280/651 |
| 2007/0210546 | A1 * | 9/2007 | Presnell | B65F 1/1415 280/47.35 |
| 2009/0152825 | A1 * | 6/2009 | Adams | B65F 1/1468 280/47.31 |
| 2009/0243240 | A1 * | 10/2009 | Boustred | B65F 1/1468 280/47.19 |
| 2012/0160577 | A1 * | 6/2012 | Anasiewicz | B62D 51/04 180/19.1 |
| 2012/0205884 | A1 * | 8/2012 | Craven | B62B 1/008 280/47.3 |
| 2014/0353947 | A1 * | 12/2014 | Frankel | B62B 3/027 280/651 |
| 2015/0035258 | A1 * | 2/2015 | Chen | B62B 3/007 280/651 |
| 2016/0167688 | A1 * | 6/2016 | Jones | B62B 3/16 280/651 |
| 2017/0174112 | A1 | 6/2017 | Sadinski et al. | |

* cited by examiner

COLLAPSIBLE TILT TRUCK

CROSS REFERENCE TO RELATED APPLICATION

This application claims the benefit of U.S. Provisional Application Ser. No. 62/841,268, which was filed on May 1, 2019, the entirety of which is incorporated herein by reference.

TECHNICAL FIELD

This disclosure relates to implementations of a tilt truck that can be used to collect, transport, and dump refuse. In particular, the present invention is directed to a tilt truck configured so that it can be collapsed (or folded) when not in use.

BACKGROUND

The use of a tilt truck for collecting, transporting, and dumping materials (e.g., refuse) is well known in the prior art, and has become an industry standard for commercial refuse removal. Janitors tasked with collecting, transporting, and disposing of refuse collected from an office building often find the size and utility of a tilt truck preferable to that of a conventional garbage can. Unfortunately, many office buildings do not have janitorial closets of sufficient size to house a conventional tilt truck. As a result, wheeled garbage cans are often used in their stead. Due to storage capacity and other factors (e.g., not being able to easily dumps its contents), using a wheeled garbage can to collect and dispose of refuse is inefficient when compared to a tilt truck. This inefficiency makes the collection and disposal of refuse more labor intensive, the cost of which is ultimately passed on to the client.

Conventional tilt trucks generally include a tub (or collection bin) used to collect materials (e.g., refuse) that need to be transported to a dumpster and disposed of. But the included tub is simply a storage space that does not facilitate the separation of different materials (e.g., the separation of bagged trash from loose trash or recyclables). Also, due to the size and weight of conventional tilt trucks, shipping can be a significant expense. In some instances, the cost of shipping a tilt truck is nearly equal to the sale price of the unit being transported.

Accordingly, it can be seen that needs exist for the collapsible tilt truck disclosed herein. It is to the provision of a collapsible tilt truck configured to address these needs, and others, that the present invention is primarily directed.

SUMMARY OF THE INVENTION

Implementations of a collapsible tilt truck that can be used to collect, transport, and dump refuse are provided. The tilt truck is configured so that it can be collapsed (or folded) when not in use, thereby facilitating its storage in a janitorial closet or other compact space. Also, due to its decreased dimensional weight, a collapsible tilt truck may be cheaper to ship that a conventional tilt truck.

In some implementations, the tilt truck comprises a collapsible frame and collection bin. The collection bin is comprised of a two-part bottom panel, a front panel, a back panel, and two lateral side panels, each of the panels is attached to the collapsible frame. The lateral side panels are configured to fold (or pleat) when the tilt truck is collapsed.

In some implementation, the collapsible tilt truck includes a trash bag bracket that is positioned within the collection bin of the tilt truck. In this way, a trash bag can be secured to the trash bag bracket and used to collect and transport loose trash and/or recyclables separately from the refuse generally stored in the collection bin.

BRIEF DESCRIPTION OF THE DRAWINGS

Like reference numerals refer to corresponding parts throughout the several views of the drawings.

DETAILED DESCRIPTION

Figure 1:
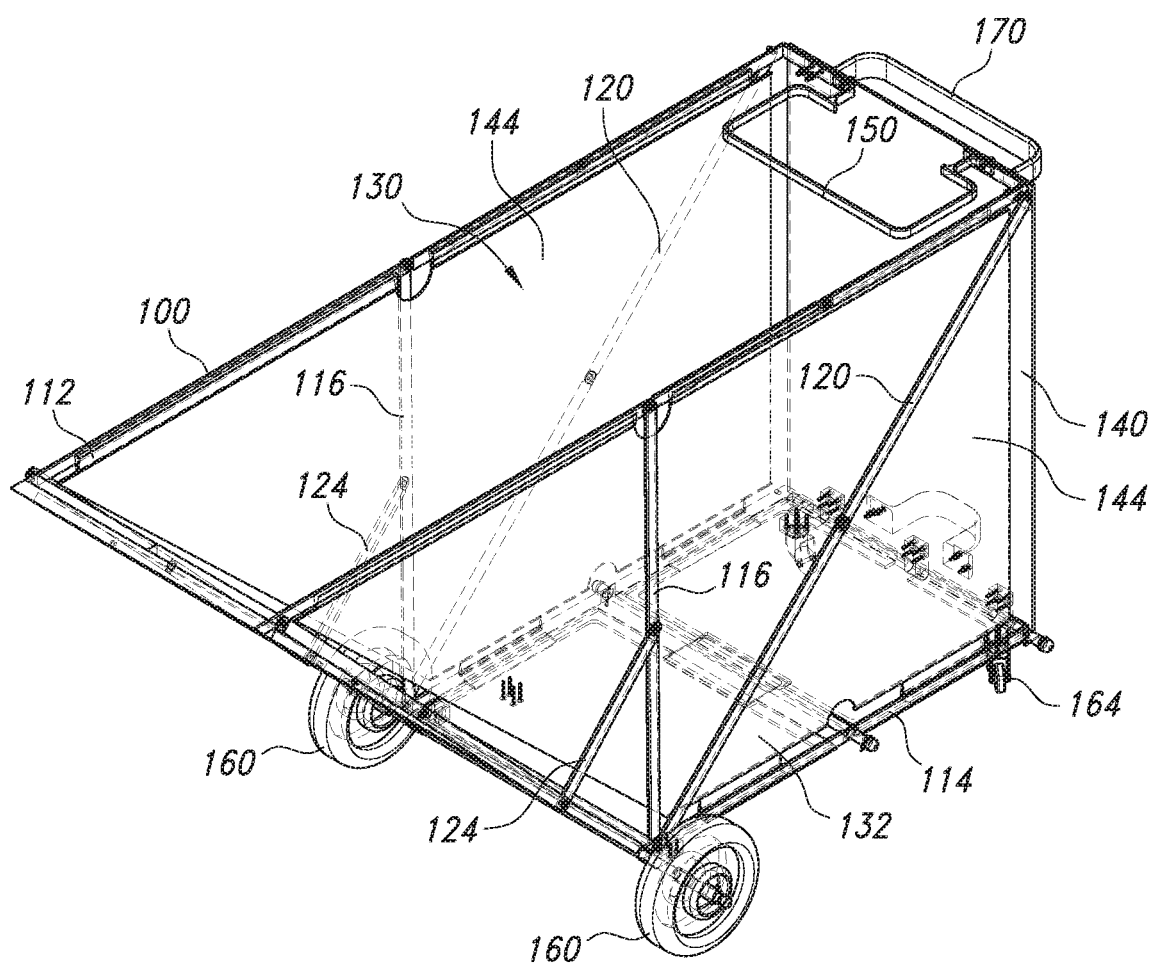
FIG. 1 illustrates an exemplary implementation of a collapsible tilt truck according to the principles of the present disclosure, wherein the collapsible tilt truck is in the in-use position.

FIGS. 1-6 illustrate an example collapsible tilt truck 100 according to the principles of the present disclosure. The collapsible tilt truck 100 can be used to collect, transport, and dump refuse; and is configured so that it can be collapsed (or folded) when not in use, thereby facilitating its storage in a janitorial closet or other compact space. Also, due to its decreased dimensional weight, a collapsible tilt truck 100 may be cheaper to ship that a conventional tilt truck.

As shown in FIGS. 1-6, in some implementations, the tilt truck 100 comprises a collapsible frame 110 and collection bin 130. The collection bin 130 is comprised of a two-part bottom panel 132, a front panel 136, a back panel 140, and two lateral side panels 144, each panel is attached to the collapsible frame 110. The lateral side panels 144 are configured to fold (or pleat) when the tilt truck 110 is collapsed.

In some implementation, the collapsible tilt truck 100 may include a trash bag bracket 150 that is positioned within the collection bin 130 of the tilt truck 100. In this way, a trash bag can be secured to the bracket 150 and used to collect and transport loose trash and/or recyclables separately from the refuse generally stored in the collection bin 130.

Figure 2:
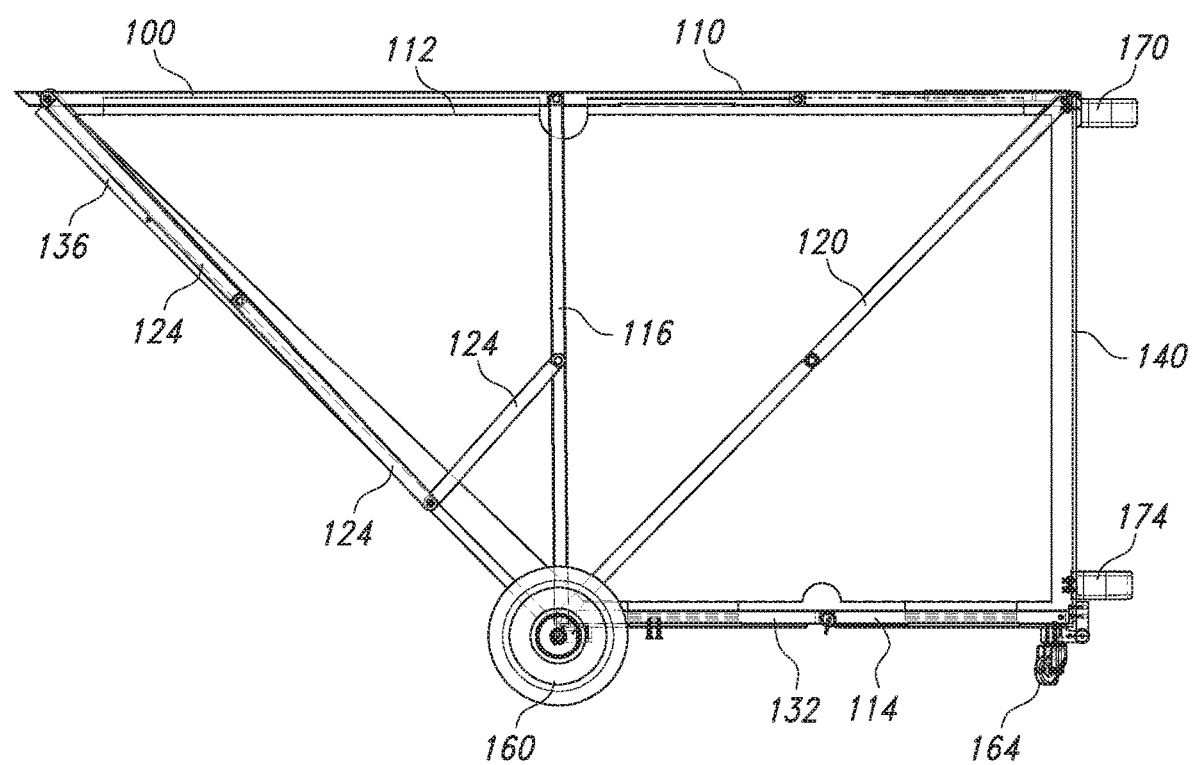
FIG. 2 illustrates a side view of the collapsible tilt truck shown in FIG. 1.

As shown in FIGS. 1 and 2, in some implementations, the collapsible frame 110 of the tilt truck 100 comprises an upper perimeter framework 112 that is connected to a lower perimeter framework 114 by a plurality of connecting supports (e.g., elements 116, 120, 124). In some implementations, the upper perimeter framework 112, the lower perimeter framework 114, and some of the connecting supports (e.g., elements 120, 124) can articulate, thereby allowing the frame 110 to collapse (see, e.g., FIG. 5).

As shown in FIGS. 1 and 2, in some implementations, the upper perimeter framework 112 and the lower perimeter framework 114 are joined by two vertical supports 116 and two articulating side supports 120. In some implementations, the two articulating side supports 120 extend diagonally between the upper and lower perimeter frameworks 112, 114. In some implementations, a first end and a second end of each articulating side support 120 may be connected to the upper perimeter framework 112 and the lower perimeter framework 114, respectively, by a peg or other suitable fastener. Each articulating side support 120 comprises two segments connected by a fold joint (e.g., a peg connecting the two segments). In this way, the two segments of each articulating side support 120 can pivot relative to one another between the respective in-use and collapsed (or folded) positions of the collapsible frame 110.

Further, in some implementations, two articulating front supports 124 connect the front end of the upper perimeter framework 112 to the vertical supports 116 of the collapsible frame 110. In some implementations, a first end and a second end of each articulating front support 124 may be connected to the upper perimeter framework 112 and one of the vertical supports 116, respectively, by a peg or other suitable fastener. Each articulating front support 124 comprises three segments connected by two fold joints, each fold joint could be a peg connecting two adjacent segments for example. In this way, the three segments of each articulating front support 124 can pivot relative to one another between the respective in-use and collapsed (or folded) positions of the collapsible frame 110.

Figure 5:
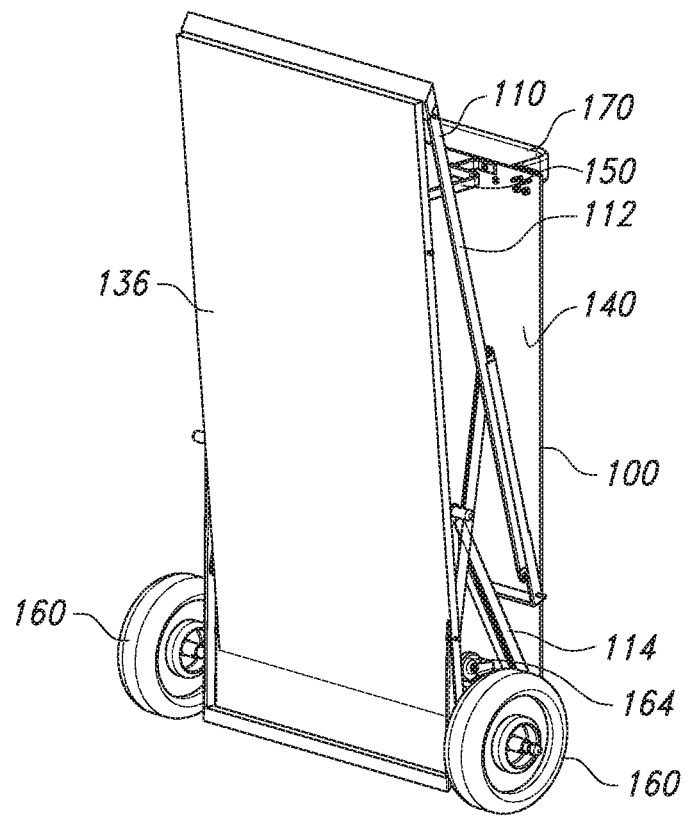
FIG. 5 illustrates an isometric view of the collapsible tilt truck shown in FIG. 1, wherein the collapsible tilt truck is in the collapsed position.
Figure 6:
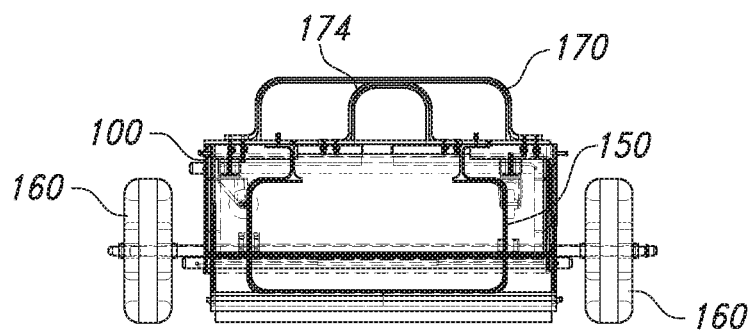
FIG. 6 illustrates a top view of the collapsible tilt truck shown in FIG. 5.
Figure 7A:
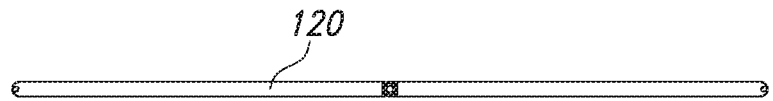
FIGS. 7A-7C illustrate example connecting supports for the collapsible tilt truck shown in FIG. 1.
Figure 7B:
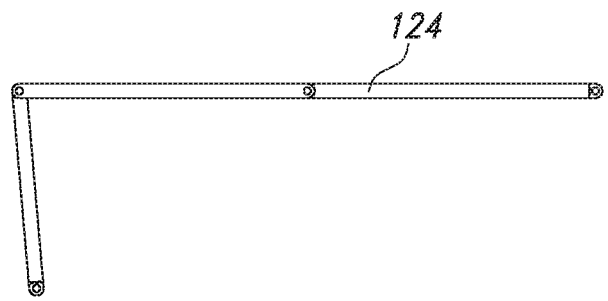
Figure 7C:
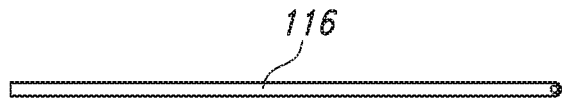
Figure 8A:
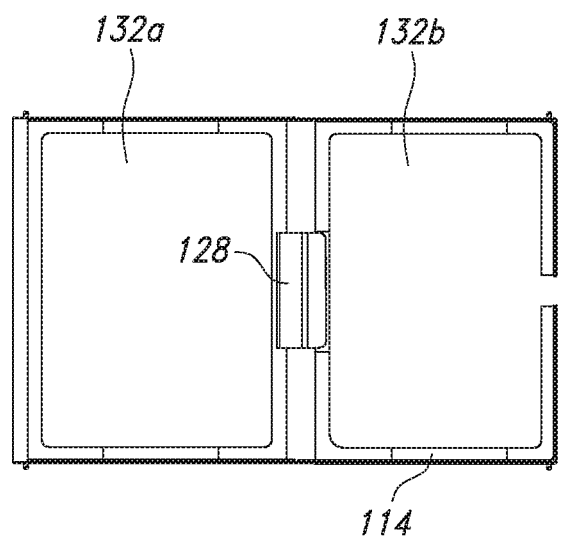
FIG. 8A illustrates a top view of an exemplary lower perimeter framework for the collapsible tilt truck shown in FIG. 1.
Figure 8B:
FIG. 8B illustrates a side view of the lower perimeter framework shown in FIG. 8A.

As shown in FIGS. 5, 8A and 8B, in some implementations, the lower perimeter framework 114 is configured to fold and comprises two segments connected by a hinge. In some implementations, there is a stabilizing latch 128, or other suitable mechanism, positioned between the two segments of the lower perimeter framework 114. The stabilizing latch 128 is configured to secure the lower perimeter framework 114 in the in-use (or unfolded) position (see, e.g., FIG. 2). In this way, the frame 110 is prevented from collapsing (or folding) while the tilt truck 100 is being used. The stabilizing latch 128 can be disengaged, thereby allowing the lower perimeter framework 114 to fold and the frame 110 as a whole to be collapsed (see, e.g., FIG. 5).

In some implementations, the collapsible frame 110 of the tilt truck 100 may include curved support rails which provide fulcrums about which to tilt the collapsible tilt truck 100 forwardly for dumping. In some implementations, the curved support rails are portions of the collapsible frame 110.

In some implementation, each portion of the collapsible frame 110 may be a tubular component having a rectangular cross section or a circular cross section. In some implementations, each portion of the collapsible frame 110 may be made of aluminum, steel, or another suitable material.

As shown in FIGS. 8A and 8B, in some implementations, the two-part bottom panel 132 of the collection bin 130 is integrated into the lower perimeter framework 114 of the collapsible frame 110. Each segment of the lower perimeter framework 114 includes a segment 132a, 132b of the two-part bottom panel 132.

As shown in FIG. 2, in some implementations, the front panel 136 of the collection bin 130 is sharply inclined downward and extends between a front end of the upper perimeter framework 112 and a front end of the lower perimeter framework 114. In this way, the collection bin 130 may be dumped by tilting the collapsible tilt truck 100 forward. In some implementations, the back panel 140 extends between a back end of the upper perimeter framework 112 and a back end of the lower perimeter framework 114.

In some implementations, the two-part bottom panel 132, the front panel 136, and the back panel 140 of the collection bin 130 are made of a ridged, durable, and impact resistant material such as high-density polyethylene.

Figure 9:
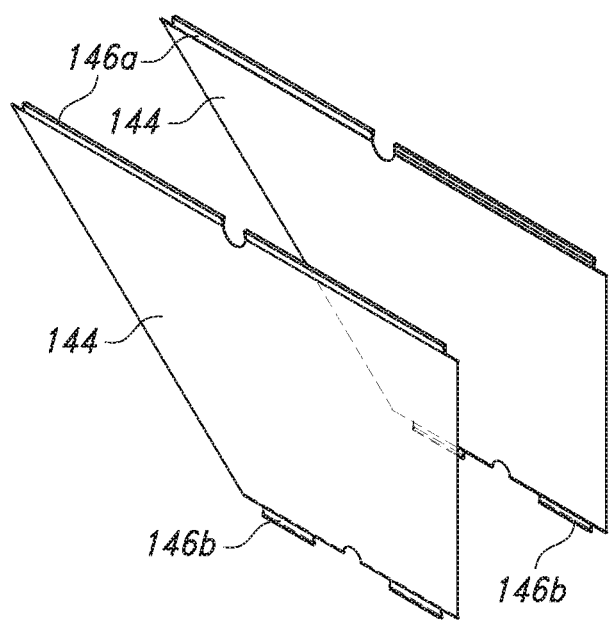
FIG. 9 illustrates exemplary lateral side panels for the collapsible tilt truck shown in FIG. 1.

As shown in FIG. 1, in some implementations, each lateral side panel 144 of the collection bin 130 extends between a side portion of the upper perimeter framework 112 and a side portion of the lower perimeter framework 114. In some implementations, as shown in FIG. 9, a top side edge 146a and a bottom side edge 146b of each lateral side panel 144 is configured to be removably secured to the upper perimeter framework 112 and the lower perimeter framework 114, respectively. In some implementations, the top and bottom side edges 146a, 146b of each lateral side panel 144 may include one or more tabs thereon that can be folded over a side portion of the upper or lower perimeter framework 114, 116 and secured in place using one or more fasteners (e.g., snaps, hook-and-loop fasteners, etc.). In this way, the lateral side panels 144 can be easily cleaned and/or replaced.

Although not shown, in some implementations, at least one of the lateral side panels 144 may include a door configured to allow access to the interior of the collection bin 130. In this way, a user may remove refuse from the collection bin 130 of the tilt truck 100 even when a dock or lift is unavailable.

In some implementations, each of the lateral side panels 144 is a sheet of material that is flexible and water resistant, tarpaulin for example. In this way, the lateral side panels can fold (or pleat) when the tilt truck 100 is being collapsed.

Figure 3:
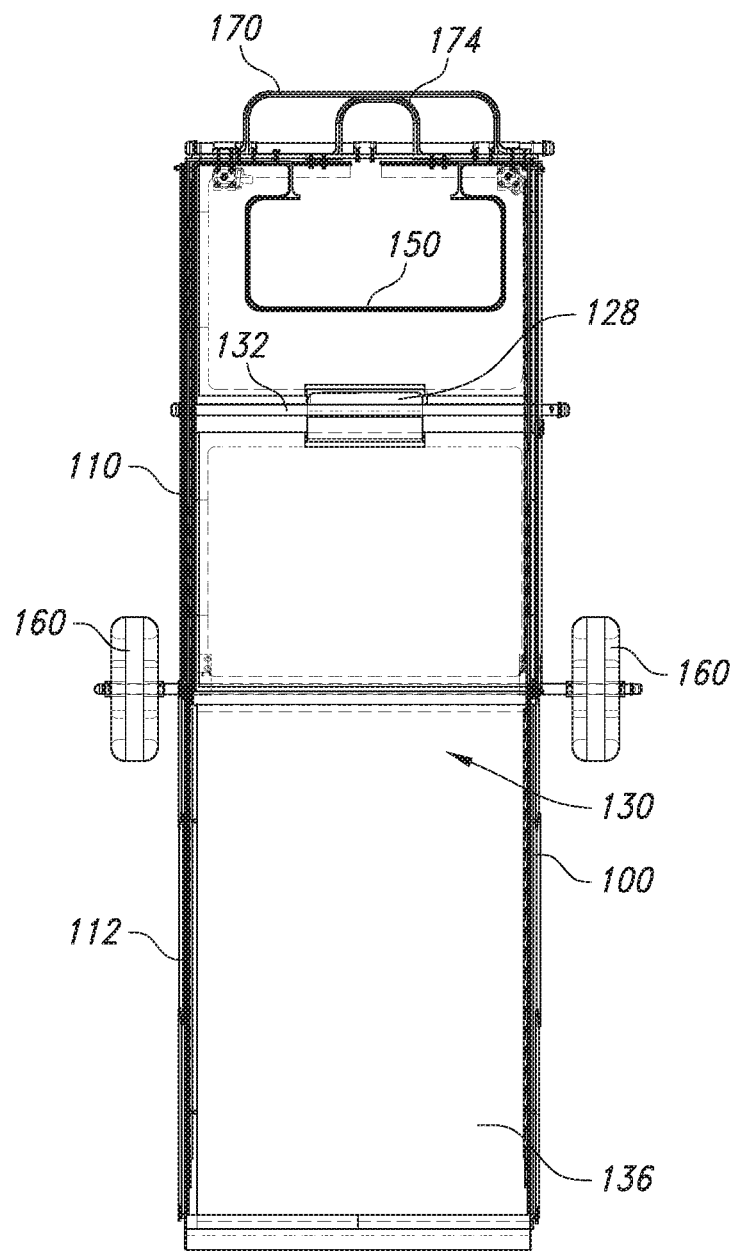
FIG. 3 illustrates a top view of the collapsible tilt truck shown in FIG. 1.
Figure 4:
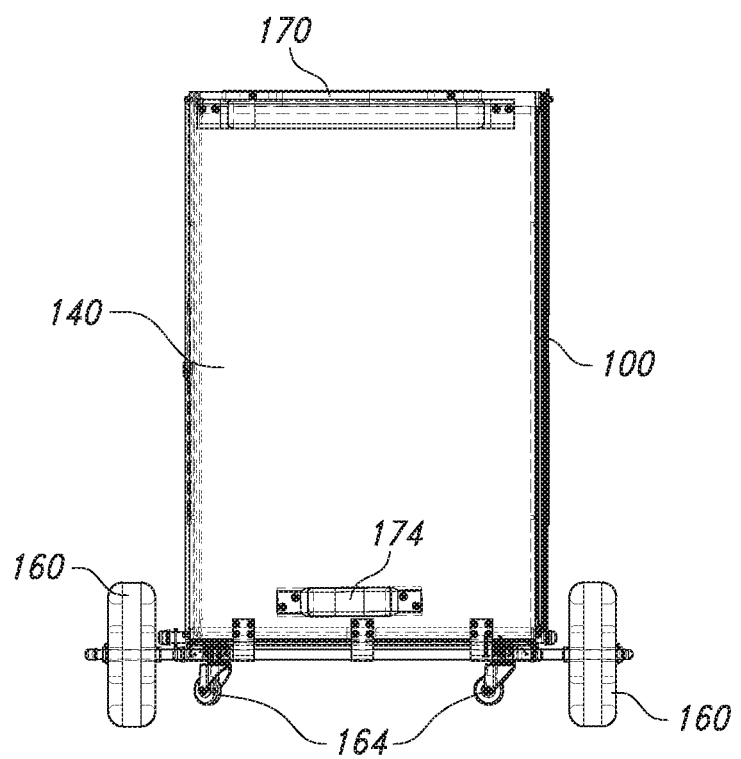
FIG. 4 illustrates a rear view of the collapsible tilt truck shown in FIG. 1.

As shown in FIGS. 1 and 3, a trash bag bracket 150 may be secured to the upper perimeter framework 112 and/or the back panel 140 of the tilt truck 100 and thereby positioned within the collection bin 130. In some implementations, the trash bag bracket 150 is configured so that the mouth of a trash bag can be folded over the rim 152 thereof and held in place using one or more clips. In this way, loose trash or recyclables can be placed in an attached trash bag by dropping the item(s) through the opening 154 defined by the trash bag bracket 150. In some implementations, the trash bag bracket 150 may be held in a fixed position, as shown in FIG. 1, or configured to fold (not shown).

Figure 10A:
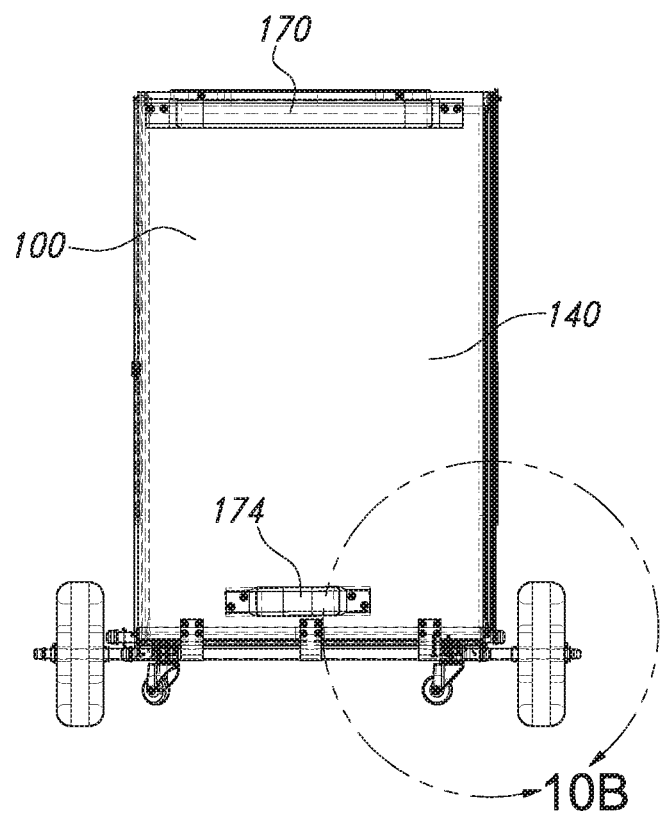
FIG. 10A illustrates another rear view of the collapsible tilt truck shown in FIG. 1.
Figure 10B:
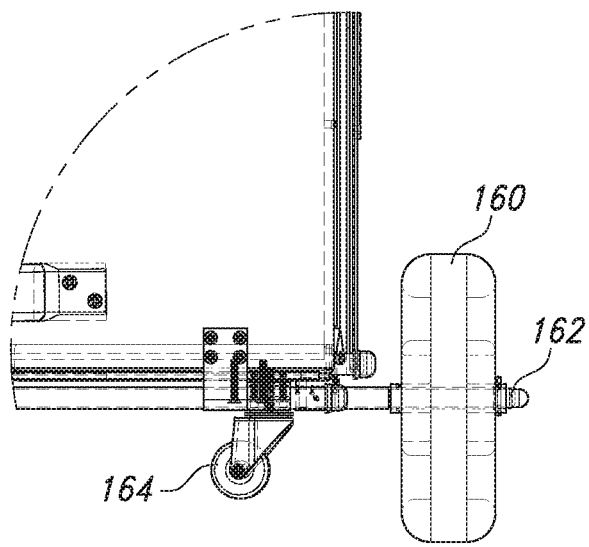
FIG. 10B illustrates a partially enlarged view of FIG. 10A.

As shown in FIGS. 1 and 10A-10B, in some implementations, the collapsible tilt truck 100 includes a combination of wheels 160 and swivel casters 164 that are secured to an underside thereof. In this way, the collapsible tilt truck 100 can be easily propelled and steered. In some implementations, two front wheels 160 may be secured to an axle 162 that is attached to the underside of the collapsible frame 110, near the front end of the lower perimeter framework 114. In some implementations, two swivel casters 164 may be secured to the underside of the collapsible frame 110, near the back end of the lower perimeter framework 114.

Figure 11A:
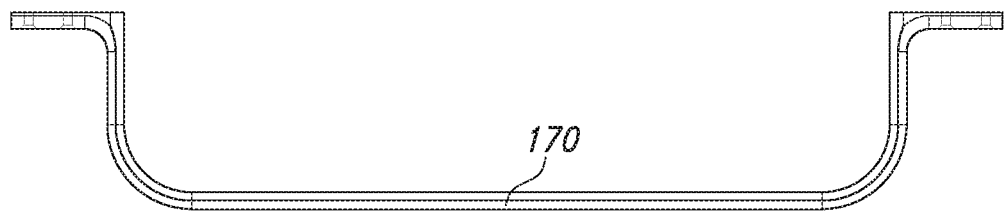
FIG. 11A illustrates a top view of an exemplary push handle for the collapsible tilt truck shown in FIG. 1.

As shown in FIGS. 2 and 11A, in some implementations, the collapsible tilt truck 100 includes a push handle 170 that, in conjunction with the wheels 160 and casters 164 secured to the underside thereof, can be used to propel and steer the collapsible tilt truck 110. In some implementations, the ends of the push handle 170 are secured to the back panel 130 of the collapsible tilt truck 100 by one or more fasteners.

Figure 11B:
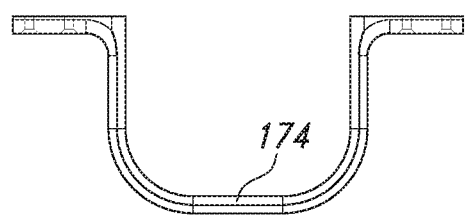
FIG. 11B illustrates a top view of an exemplary list handle for the collapsible tilt truck shown in FIG. 1.

As shown in FIGS. 2 and 11B, in some implementations, the tilt truck 100 includes a lift handle 174 that can be used to dump the contents of the collection bin 130. In some implementations, the lift handle 174 can be used to lift the back end of the tilt truck 100 so that it comes to rest on the front end thereof. In this way, the contents of the collection bin 130 can be dumped or otherwise removed therefrom. In some implementations, the lift handle 174 is positioned near the bottom end of the back panel 140, the ends of the lift handle 174 being secured to the back panel 140 by one or more fasteners.

In some implementations, the following steps may be taken to collapse (or fold) the tilt truck 100. Initially, the stabilizing latch 128 is disengaged so that the lower perimeter framework 114, and the rest of the frame 110, can be folded. Then, the front end and the back end of the tilt truck 110 are push together (see, e.g., FIGS. 5 and 6). The tilt truck 100 is now collapsed (or folded) and ready for storage. The collapsed tilt truck 100 may be rolled on its wheels 160 to a storage location.

Although not shown, in some implementations, one or more straps may be used to secure the tilt truck 100 in the collapsed (or folded) position. In some implementations, one end of a strap may be secured to the back panel 140 and the other end of the strap secured to the front panel 136.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A tilt truck configured so that it can be collapsed when not in use, the tilt truck comprising:
    a collapsible frame comprising an upper perimeter framework and a lower perimeter framework connected together by a plurality of connecting supports, the plurality of connecting supports include two vertical supports, two articulating side supports, and two articulating front supports; and
    a collection bin attached to the collapsible frame;
    wherein the collection bin can be dumped by tilting the tilt truck forward;
    wherein the two vertical supports and the two articulating side supports join the upper perimeter framework to the lower perimeter framework;
    wherein the two articulating front supports connect a front end of the upper perimeter framework to the vertical supports, a first end of each articulating front support is attached to a separate forward edge of the upper perimeter framework.

2. The tilt truck of claim 1, further comprising a trash bag bracket that is positioned within the collection bin of the tilt truck, the trash bag bracket is configured so that a trash bag can be secured thereto.

3. The tilt truck of claim 1, wherein the collection bin comprises a two-part bottom panel, a front panel, a back panel, and two lateral side panels, each of the panels is attached to the collapsible frame.

4. The tilt truck of claim 3, further comprising a trash bag bracket that is positioned within the collection bin of the tilt truck, the trash bag bracket is configured so that a trash bag can be secured thereto.

5. The tilt truck of claim 3, wherein at least one of the two lateral side panels includes a door configured to allow access to the interior of the collection bin.

6. The tilt truck of claim 3, wherein the two lateral side panels are configured to fold when the tilt truck is collapsed.

7. The tilt truck of claim 3, wherein the front panel of the collection bin is sharply inclined downward and extends between the front end of the upper perimeter framework and a front end of the lower perimeter framework.

8. The tilt truck of claim 1, wherein the lower perimeter framework is configured to fold.

9. A tilt truck configured so that it can be collapsed when not in use, the tilt truck comprising:
    a collapsible frame comprising an upper perimeter framework and a lower perimeter framework connected together by a plurality of connecting supports, the plurality of connecting supports include two vertical supports, two articulating side supports, and two articulating front supports;
    a collection bin attached to the collapsible frame;
    a combination of wheels and casters;
    a push handle that, in conjunction with the wheels and casters, can be used to propel and steer the tilt truck; and
    a lift handle that can be used to lift a back end of the tilt truck and thereby empty the collection bin;
    wherein the two vertical supports and the two articulating side supports join the upper perimeter framework to the lower perimeter framework;
    wherein the two articulating front supports connect a front end of the upper perimeter framework to the vertical supports, a first end of each articulating front support is attached to a separate forward edge of the upper perimeter framework.

10. The tilt truck of claim 9, further comprising a trash bag bracket that is positioned within the collection bin of the tilt truck, the trash bag bracket is configured so that a trash bag can be secured thereto.

11. The tilt truck of claim 9, wherein the collection bin comprises a two-part bottom panel, a front panel, a back panel, and two lateral side panels, each of the panels is attached to the collapsible frame.

12. The tilt truck of claim 11, further comprising a trash bag bracket that is positioned within the collection bin of the tilt truck, the trash bag bracket is configured so that a trash bag can be secured thereto.

13. The tilt truck of claim 11, wherein at least one of the two lateral side panels includes a door configured to allow access to the interior of the collection bin.

14. The tilt truck of claim 11, wherein the two lateral side panels are configured to fold when the tilt truck is collapsed.

15. The tilt truck of claim 11, wherein the front panel of the collection bin is sharply inclined downward and extends between the front end of the upper perimeter framework and a front end of the lower perimeter framework.

16. The tilt truck of claim 1, wherein the lower perimeter framework is configured to fold.

* * * * *